(12) United States Patent
Phillips et al.

(10) Patent No.: US 8,251,856 B2
(45) Date of Patent: Aug. 28, 2012

(54) MULTI-SPEED TRANSMISSION HAVING FOUR PLANETARY GEAR SETS FOR PRODUCING AT LEAST EIGHT GEAR SPEEDS

(75) Inventors: Andrew W. Phillips, Rochester, MI (US); James M. Hart, Belleville, MI (US); Scott H. Wittkopp, Ypsilanti, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 412 days.

(21) Appl. No.: 12/688,543

(22) Filed: Jan. 15, 2010

(65) Prior Publication Data
US 2011/0177909 A1    Jul. 21, 2011

(51) Int. Cl.
*F16H 3/44* (2006.01)
(52) U.S. Cl. .................. 475/280; 475/286; 475/288
(58) Field of Classification Search .............. 475/271, 475/275–291, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 2005/0090362 A1 | 4/2005 | Abe et al. | |
| 2005/0137050 A1* | 6/2005 | Winzeler | 475/296 |
| 2006/0270513 A1 | 11/2006 | Klemen | |
| 2006/0270516 A1 | 11/2006 | Klemen | |
| 2011/0105266 A1* | 5/2011 | Phillips et al. | 475/275 |
| 2011/0111915 A1* | 5/2011 | Hart et al. | 475/271 |
| 2011/0177908 A1* | 7/2011 | Wittkopp et al. | 475/271 |

* cited by examiner

*Primary Examiner* — Roger Pang

(57) ABSTRACT

A transmission of the present invention has an input member, an output member, four planetary gear sets, a plurality of coupling members and a plurality of torque transmitting devices. Each of the planetary gear sets includes first, second and third members. The torque transmitting devices may include clutches and brakes. The torque transmitting devices are selectively engageable in combinations of at least two to establish at least eight forward speed ratios and at least one reverse speed ratio.

32 Claims, 3 Drawing Sheets

| GEAR STATE | GEAR RATIO | RATIO STEP | TORQUE TRANSMITTING ELEMENTS | | | | | |
|---|---|---|---|---|---|---|---|---|
| | | | 32 | 34 | 30 | 36 | 28 | 26 |
| REV | -2.615 | | | | X | X | | |
| N | | -0.72 | | | | O | | |
| 1ST | 3.646 | | | | | X | X | |
| 2ND | 2.037 | 1.79 | | X | | | X | |
| 3RD | 1.526 | 1.34 | X | | | | X | |
| 4TH | 1.262 | 1.21 | | | X | | X | |
| 5TH | 1.000 | 1.26 | | | | | X | X |
| 6TH | 0.792 | 1.26 | | | X | | | X |
| 7TH | 0.696 | 1.14 | X | | | | | X |
| 8TH | 0.608 | 1.15 | | X | | | | X |

X = ON, ENGAGED CARRYING TORQUE
O = ON, ENGAGED NOT CARRYING TORQUE

| GEAR STATE | GEAR RATIO | RATIO STEP | TORQUE TRANSMITTING ELEMENTS ||||||
|---|---|---|---|---|---|---|---|---|
| | | | 136 | 132 | 134 | 130 | 126 | 128 |
| REV | -1.544 | | X | | | X | | |
| N | | -0.34 | | | | | | |
| 1ST | 4.498 | | X | | | | | X |
| 2ND | 2.579 | 1.74 | | X | | | | X |
| 3RD | 1.744 | 1.48 | | | X | | | X |
| 4TH | 1.150 | 1.52 | | | | X | | X |
| 5TH | 1.000 | 1.15 | | | | | X | X |
| 6TH | 0.851 | 1.18 | | | | X | X | |
| 7TH | 0.787 | 1.08 | | | X | | X | |
| 8TH | 0.671 | 1.17 | | | X | X | | |

X = ON, ENGAGED CARRYING TORQUE
O = ON, ENGAGED NOT CARRYING TORQUE

MULTI-SPEED TRANSMISSION HAVING FOUR PLANETARY GEAR SETS FOR PRODUCING AT LEAST EIGHT GEAR SPEEDS

FIELD

The invention relates generally to a multiple speed transmission having a plurality of planetary gear sets and a plurality of torque transmitting devices, and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In an aspect of the present invention a transmission is provided having an input member, an output member, a first, second, third and fourth planetary gear sets each having sun gears, carrier members and ring gears. The input member is continuously interconnected with the ring gear of the third planetary gear set. The output member is selectively interconnected with the ring gear of the fourth planetary gear set.

Additionally, a first interconnecting member continuously interconnects the sun gear of the first planetary gear set with carrier member of the second planetary gear set, a second interconnecting member continuously interconnects the carrier member of the first planetary gear set with the ring gear of the second planetary gear set and the sun gear of the fourth planetary gear set, a third interconnecting member continuously interconnects the ring gear of the first planetary gear set with the carrier member of the third planetary gear set, a fourth interconnecting member continuously interconnects the sun gear of the second planetary gear set with the sun gear of the third planetary gear set.

Further, a first torque transmitting device is selectively engageable to interconnect the input member and the ring gear of the third planetary gear set with the carrier member of the fourth planetary gear set, a second torque transmitting device is selectively engageable to interconnect the ring gear of the first planetary gear set and the carrier member of the third planetary gear set with the carrier member of the fourth planetary gear set, a third torque transmitting device is selectively engageable to interconnect the sun gear of the second planetary gear set and the sun gear of the third planetary gear set with the stationary member, a fourth torque transmitting device is selectively engageable to interconnect the carrier member of the second planetary gear set and the sun gear member of the first planetary gear set with the stationary member, a fifth torque transmitting device is selectively engageable to interconnect the ring gear member of the second planetary gear set, carrier member of the first, and the sun gear member of the fourth planetary gear set with the stationary member, and a sixth torque transmitting device is selectively engageable to interconnect the carrier member of the fourth planetary gear set with the stationary member. The torque transmitting devices are selectively engageable in combinations of at least two to establish at least eight forward speed ratios and at least one reverse speed ratio between the input member and the output member.

In another aspect of the present invention a transmission is provided having an input member, an output member, a first, second, third and fourth planetary gear sets each having sun gears, carrier members and ring gears. The input member is continuously interconnected with the ring gear of the fourth planetary gear set. The output member is selectively interconnected with the ring gear of the third planetary gear set.

Additionally, a first interconnecting member continuously interconnects the sun gear of the first planetary gear set with sun gear of the second planetary gear set, a second interconnecting member continuously interconnects the carrier member of the first planetary gear set with the carrier member of the third planetary gear set, a third interconnecting member continuously interconnects the ring gear of the first planetary gear set with the carrier member of the second planetary gear set and the carrier member of the fourth planetary gear set, a fourth interconnecting member continuously interconnects the ring gear of the second planetary gear set with the sun gear of the third planetary gear set.

Further, a first torque transmitting device is selectively engageable to interconnect the input member and the ring gear of the fourth planetary gear set with the carrier member of the first planetary gear set, a second torque transmitting device is selectively engageable to interconnect the input member and the ring gear of the fourth planetary gear set with the sun gear of the first planetary gear set and the sun gear of the second planetary gear set, a third torque transmitting device is selectively engageable to interconnect the sun gear of the fourth planetary gear set with the stationary member, a fourth torque transmitting device is selectively engageable to interconnect the ring gear of the first planetary gear set, the carrier member of the second planetary gear set and the carrier member of the fourth planetary gear set with the stationary member, a fifth torque transmitting device is selectively engageable to interconnect the ring gear of the second planetary gear set and the sun gear of the third planetary gear set with the stationary member, and a sixth torque transmitting device is selectively engageable to interconnect the carrier member of the first planetary gear set and the carrier member of the third planetary gear set with the stationary member. The torque transmitting devices are selectively engageable in combinations of at least two to establish at least eight forward speed ratios and at least one reverse speed ratio between the input member and the output member.

It is thus an object of the present invention to provide a transmission having four planetary gear sets.

It is a further object of the present invention to provide a transmission having eight forward speeds and at least one reverse.

It is a still further object of the present invention to provide a transmission having four planetary gear sets, a plurality of coupling members and a plurality of torque transmitting devices.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. A first component or element of a first planetary gear set is permanently coupled to a second component or element of a second planetary gear set. A second component or element of the first planetary gear set is permanently coupled to a third component or element of a second planetary gear set. A third component or element of the first planetary gear set is permanently coupled to a second component or element of the third planetary gear set. A first component or element of the second planetary gear set is permanently coupled to a first component or element of a third planetary gear set. Finally, the second component or element of the first planetary gear set is also permanently coupled to a first component or element of a fourth planetary gear set.

Figure 1:
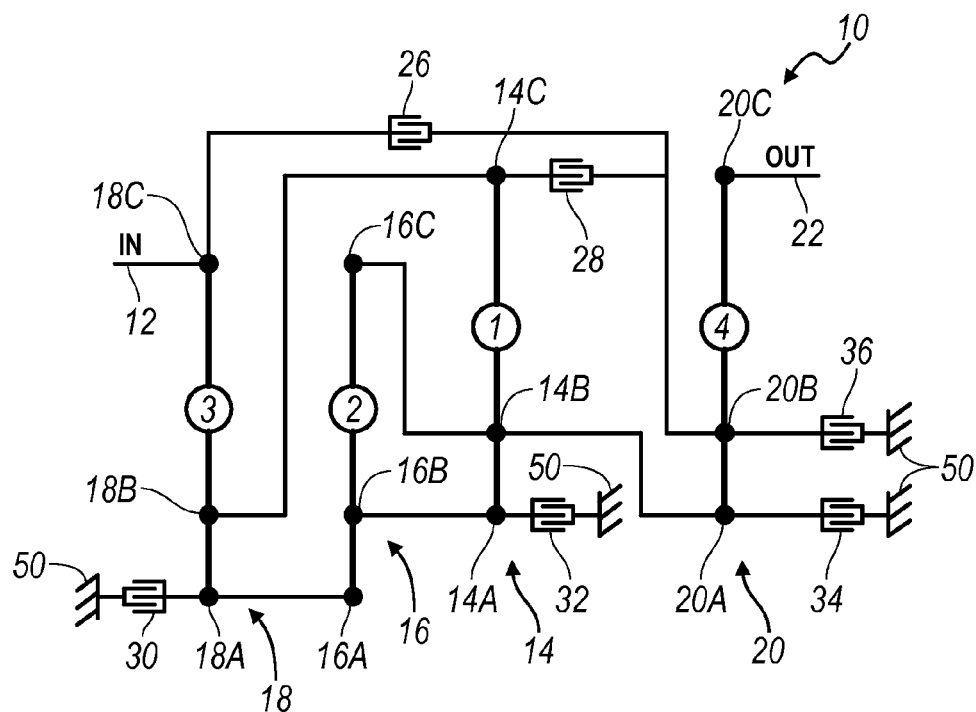
FIG. 1 is a lever diagram of an embodiment of a eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the third node 18C of the third planetary gear set 18. The first node 14A of the first planetary gear set 14 is coupled to the second node 16B of the second planetary gear set 16. The second node 14B of the first planetary gear set 14 is coupled to the third node 16C of the second planetary gear set 16 and to the first node 20A of the fourth planetary gear set 20. The third node 14C of the first planetary gear set 14 is coupled to the second node 18B of the third planetary gear set 18. The first node 16A of the second planetary gear set 16 is coupled to the first node 18A of the third planetary gear set 18. The output member 22 is coupled to the third node 20C of the fourth planetary gear set 20.

A first clutch 26 selectively connects the third node 18C of the third planetary gear set 18 with the second node 20B of the fourth planetary gear set 20. A second clutch 28 selectively connects the third node 14C of the first planetary gear set 14 with the second node 20B of the fourth planetary gear set 20. A first brake 30 selectively connects the first node 18A of the third planetary gear set 18 with a stationary element or a transmission housing 50. A second brake 32 selectively connects the first node 14A of the first planetary gear set 14 with a stationary element or a transmission housing 50. A third brake 34 selectively connects the first node 20A of the fourth planetary gear set 20 with a stationary element or a transmission housing 50. A fourth brake 36 selectively connects the second node 20B of the fourth planetary gear set 20 with the stationary element or the transmission housing 50.

Figure 2:
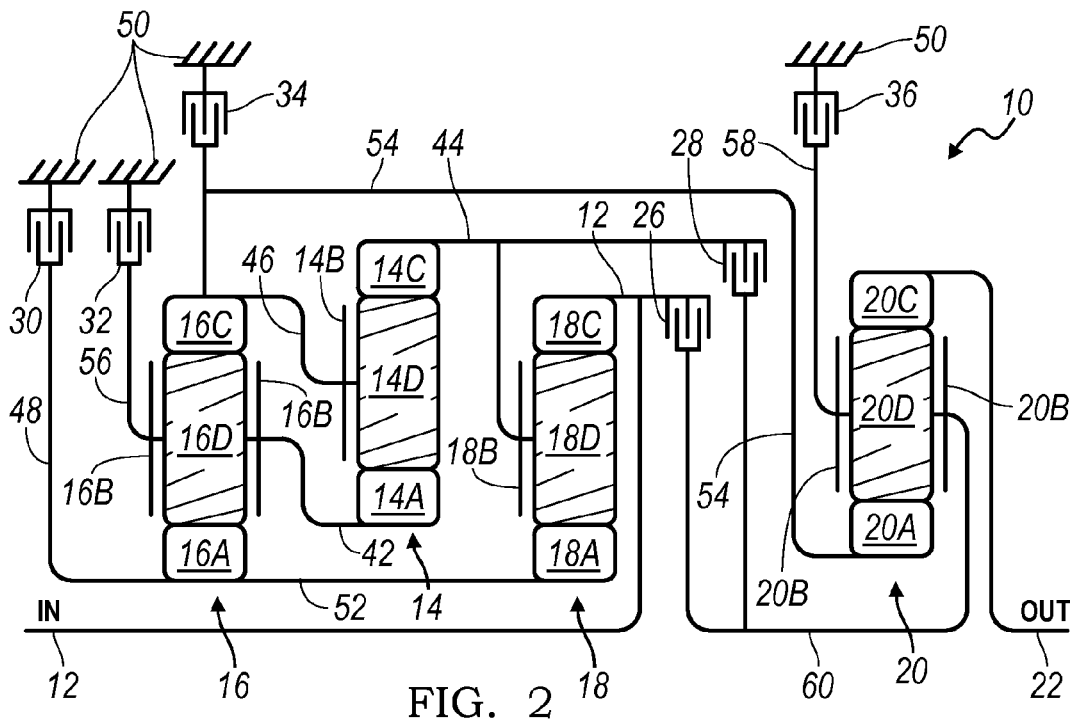
FIG. 2 is a diagrammatic view of an embodiment of a eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44. The planet carrier member 14B is connected for common rotation with a third shaft or interconnecting member 46. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with a fourth shaft or interconnecting member 48 and a fifth shaft or interconnecting member 52. The ring gear member 16C is connected for common rotation with the third shaft or interconnecting member 46 and with a sixth shaft or interconnecting member 54. The planet carrier member 16B is connected for common rotation with the first shaft or interconnecting member 42 and with a seventh shaft or interconnecting member 56. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with the fifth shaft or interconnecting member 52. The ring gear member 18C is connected for common rotation with the input shaft or member 12. The planet carrier member 18B is connected for common rotation with the second shaft or interconnecting member 44. The set of planet gears 18D are each configured to intermesh with both the sun gear member 18A and the ring gear member 18C.

The planetary gear set 20 includes a sun gear member 20A, a ring gear member 20B and a planet gear carrier member 20C that rotatably supports a set of planet gears 20D (only one of which is shown). The sun gear member 20A is connected for common rotation with the sixth shaft or interconnecting member 54. The ring gear member 20C is connected for common rotation with the output shaft or member 22. The planet carrier member 20B is connected for common rotation with an eighth shaft or interconnecting member 58 and a ninth shaft or interconnecting member 60. The set of planet gears 20D are each configured to intermesh with both the sun gear member 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or the clutches 26, 28 and the brakes 30, 32, 34 and 36 allow for selective interconnection of the shafts or interconnecting members, members of the planetary gear sets and the housing. For example, the first clutch 26 is selectively engageable to connect the input shaft or member 12 with the eighth shaft or interconnecting member 58 and the ninth shaft or interconnecting member 60. The second clutch 28 is selectively engageable to connect the second shaft or interconnecting member 44 with the eighth shaft or interconnecting member 58 and the ninth shaft or interconnecting member 60. The first brake 30 is selectively engageable to connect the fourth shaft or interconnecting member 48 with a stationary element or the transmission housing 50 in order to prevent the fourth shaft or interconnecting member 48 from rotating relative to the transmission housing 50. The second brake 32 is selectively engageable to connect the seventh shaft or interconnecting member 56 with the stationary element or the transmission housing 50 in order to prevent the seventh shaft or interconnecting member 56 from rotating relative to the transmission housing 50. The third brake 34 is selectively engageable to connect the sixth shaft or interconnecting member 54 with a stationary element or the transmission housing 50 in order to prevent the sixth shaft or interconnecting member 54 from rotating relative to the transmission housing 50. The fourth brake 36 is selectively engageable to connect the eighth shaft or interconnecting member 58 with a stationary element or the transmission housing 50 in order to prevent the eighth shaft or interconnecting member 58 from rotating relative to the transmission housing 50.

Figures 3, 4:
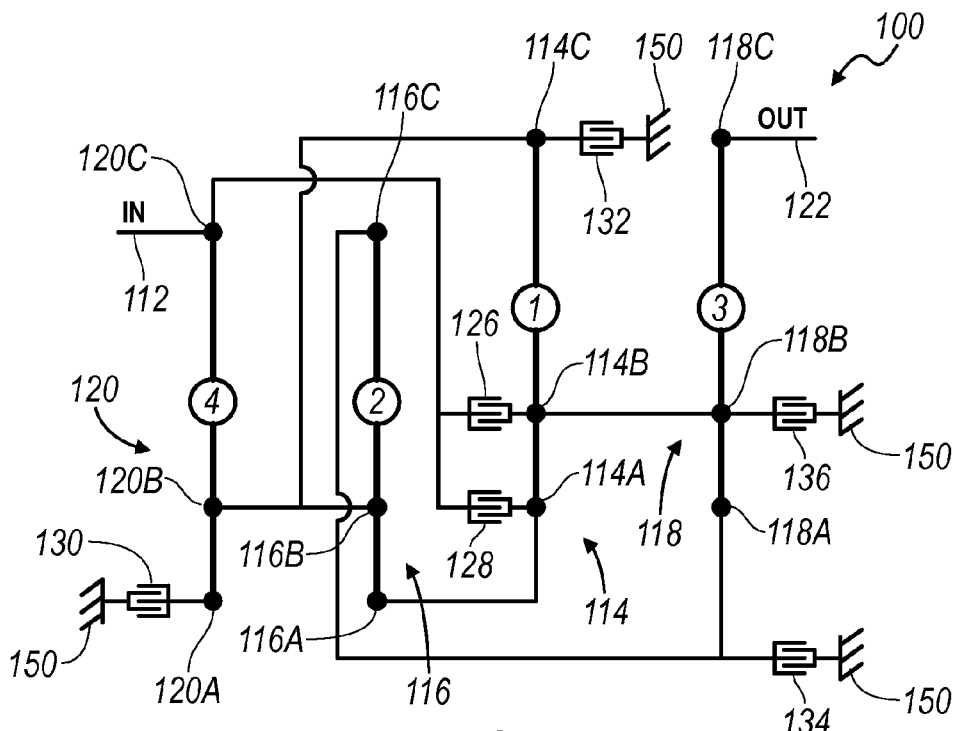
FIG. 3 is a truth table presenting the state of engagement of the various torque transmitting elements in each of the available forward and reverse speeds or gear ratios of the transmission illustrated in FIGS. 1 and 2.
FIG. 4 is a lever diagram of another embodiment of a eight speed transmission according to the present invention.

Referring now to FIGS. 2 and 3, the operation of the embodiment of the eight speed transmission 10 will be described. It will be appreciated that the transmission 10 is capable of transmitting torque from the input shaft or member 12 to the output shaft or member 22 in at least eight forward speed or torque ratios and at least one reverse speed or torque ratio with a triple overdrive. Each forward and reverse speed or torque ratio is attained by engagement of one or more of the torque-transmitting mechanisms (i.e. first clutch 26, second clutch 28, first brake 30, second brake 32, third brake 34 and fourth brake 36), as will be explained below. FIG. 3 is a truth table presenting the various combinations of torque-transmitting elements that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 30 and the fourth brake 36 are engaged or activated. The first brake 30 connects the fourth shaft or interconnecting member 48 with a stationary element or the transmission housing 50 in order to prevent the fourth shaft or interconnecting member 48 from rotating relative to the transmission housing 50. The fourth brake 36 connects the eighth shaft or interconnecting member 58 with a stationary element or the transmission housing 50 in order to prevent the eighth shaft or interconnecting member 58 from rotating relative to the transmission housing 50. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 4, another embodiment of an eight speed transmission 100 is illustrated in a lever diagram format. The transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The input member 112 is coupled to the third node 120C of the fourth planetary gear set 120. The first node 114A of the first planetary gear set 114 is coupled to the first node 116A of the second planetary gear set 116. The second node 114B of the first planetary gear set 114 is coupled to the second node 118B of the third planetary gear set 118. The third node 114C of the first planetary gear set 114 is coupled to the second node 116B of the second planetary gear set 116 and the second node 1208 of the fourth planetary gear set 120. The third node 116C of the second planetary gear set 116 is coupled to the first node 118A of the third planetary gear set 118. The output member 122 is coupled to the third node 118C of the third planetary gear set 118.

A first clutch 126 selectively connects the second node 114B of the first planetary gear set 114 with the third node 120C of the fourth planetary gear set 120. A second clutch 128 selectively connects the first node 114A of the first planetary gear set 114 with the third node 120C of the fourth planetary gear set 120. A first brake 130 selectively connects the first node 120A of the fourth planetary gear set 120 with a stationary element or a transmission housing 150. A second brake 132 selectively connects the third node 114C of the first planetary gear set 114 with a stationary element or a transmission housing 150. A third brake 134 selectively connects the first node 118A of the third planetary gear set 118 and the third node 116C of the second planetary gear set 116 with a stationary element or a transmission housing 150. A fourth brake 136 selectively connects the second node 118B of the third planetary gear set 118 with the stationary element or the transmission housing 150.

Figures 5, 6:
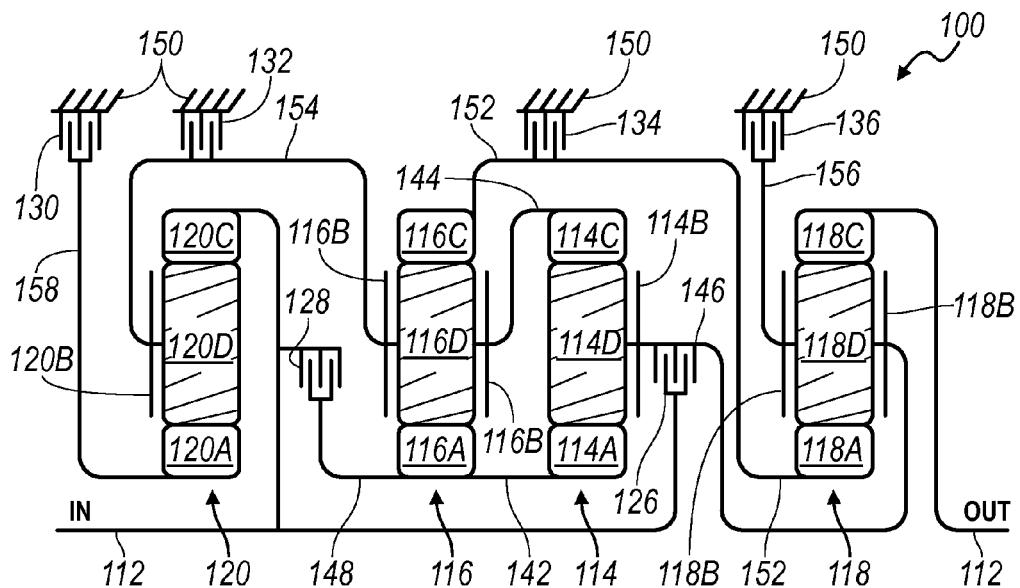
FIG. 5 is a diagrammatic view of another embodiment of a eight speed transmission according to the present invention.
FIG. 6 is a truth table presenting the state of engagement of the various torque transmitting elements in each of the available forward and reverse speeds or gear ratios of the transmission illustrated in FIGS. 4 and 5.

Referring now to FIG. 5, a stick diagram presents a schematic layout of the embodiment of the eight speed transmission 100 according to the present invention. In FIG. 5, the numbering from the lever diagram of FIG. 4 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114A, a ring gear member 114C and a planet gear carrier member 114B that rotatably supports a set of planet gears 114D (only one of which is shown). The sun gear member 114A is connected for common rotation with a first shaft or interconnecting member 142. The ring gear member 114C is connected for common rotation with a second shaft or interconnecting member 144. The planet carrier member 114B is connected for common rotation with a third shaft or interconnecting member 146. The planet gears 114D are each configured to intermesh with both the sun gear member 114A and the ring gear member 114C.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with a fourth shaft or interconnecting member 148 and the first shaft or interconnecting member 142. The ring gear member 116C is connected for common rotation with a fifth shaft or interconnecting member 152. The planet carrier member 116B is connected for common rotation with the second shaft or interconnecting member 144 and with a sixth shaft or interconnecting member 154. The planet gears 116D are each configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with the fifth shaft or interconnecting member 152. The ring gear member 118C is connected for common rotation with the output shaft or member 122. The planet carrier member 118B is connected for common rotation with the seventh shaft or interconnecting member 156 and with the third shaft or interconnecting member 146. The set of planet gears 118D are each configured to intermesh with both the sun gear member 118A and the ring gear member 118C.

The planetary gear set 120 includes a sun gear member 120A, a ring gear member 120B and a planet gear carrier member 120C that rotatably supports a set of planet gears 120D (only one of which is shown). The sun gear member 120A is connected for common rotation with the eighth shaft or interconnecting member 158. The ring gear member 120C is connected for common rotation with the input shaft or member 112. The planet carrier member 120B is connected for common rotation with the sixth shaft or interconnecting member 154. The set of planet gears 120D are each configured to intermesh with both the sun gear member 120A and the ring gear member 120C.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or the clutches 126, 128 and the brakes 130, 132, 134 and 136 allow for selective interconnection of the shafts or interconnecting members, members of the planetary gear sets and the housing. For example, the first clutch 126 is selectively engageable to connect the input shaft or member 112 with the third shaft or interconnecting member 146. The second clutch 128 is selectively engageable to connect the input shaft or member 112 with the fourth shaft or interconnecting member 148. The first brake 130 is selectively engageable to connect the eighth shaft or interconnecting member 158 with a stationary element or the transmission housing 150 in order to prevent the eighth shaft or interconnecting member 158 from rotating relative to the transmission housing 150. The second brake 132 is selectively engageable to connect the sixth shaft or interconnecting member 154 with the stationary element or the transmission housing 150 in order to prevent the sixth shaft or interconnecting member 154 from rotating relative to the transmission housing 150. The third brake 134 is selectively engageable to connect the fifth shaft or interconnecting member 152 with a stationary element or the transmission housing 150 in order to prevent the fifth shaft or interconnecting member 152 from rotating relative to the transmission housing 150. The fourth brake 136 is selectively engageable to connect the seventh shaft or interconnecting member 156 with a stationary element or the transmission housing 150 in order to prevent the seventh shaft or interconnecting member 156 from rotating relative to the transmission housing 150.

Referring now to FIGS. 5 and 6, the operation of the embodiment of the eight speed transmission 100 will be described. It will be appreciated that the transmission 100 is capable of transmitting torque from the input shaft or member 112 to the output shaft or member 122 in at least eight forward speed or torque ratios and at least one reverse speed or torque ratio with a triple overdrive. Each forward and reverse speed or torque ratio is attained by engagement of one or more of the torque-transmitting mechanisms (i.e. first clutch 126, second clutch 128, first brake 130, second brake 132, third brake 134 and fourth brake 136), as will be explained below. FIG. 6 is a truth table presenting the various combinations of torque-transmitting elements that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish reverse gear, the first brake 130 and the fourth brake 136 are engaged or activated. The first brake 130 connects the eighth shaft or interconnecting member 158 with a stationary element or the transmission housing 150 in order to prevent the eighth shaft or interconnecting member 158 from rotating relative to the transmission housing 150. The fourth brake 136 connects the seventh shaft or interconnecting member 156 with a stationary element or the transmission housing 150 in order to prevent the seventh shaft or interconnecting member 156 from rotating relative to the transmission housing 150. Likewise, the eight forward ratios are achieved through different combinations of clutch and brake engagement, as shown in FIG. 5.

It will be appreciated that the foregoing explanation of operation and gear states of the eight speed transmission 100 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    first, second, third and fourth planetary gear sets each having first, second and third members;
    a first interconnecting member continuously interconnecting the first member of the first planetary gear set with second member of the second planetary gear set;
    a second interconnecting member continuously interconnecting the second member of the first planetary gear set with the third member of the second planetary gear set and the first member of the fourth planetary gear set;
    a third interconnecting member continuously interconnecting the third member of the first planetary gear set with the second member of the third planetary gear set;
    a fourth interconnecting member continuously interconnecting the first member of the second planetary gear set with the first member of the third planetary gear set; and
    six torque transmitting devices selectively engageable to interconnect one of the first, second, and third members with at least one other of the first members, second members, third members and a stationary member, and wherein the torque transmitting devices are selectively engageable in combinations of at least two to establish at least eight forward speed ratios and at least one reverse speed ratio between the input member and the output member.

2. The transmission of claim 1 wherein a first of the six torque transmitting devices is selectively engageable to interconnect the input member and the third member of the third planetary gear set with the second member of the fourth planetary gear set.

3. The transmission of claim 2 wherein a second of the six torque transmitting devices is selectively engageable to interconnect the third member of the first planetary gear set and the second member of the third planetary gear set with the second member of the fourth planetary gear set.

4. The transmission of claim 3 wherein a third of the six torque transmitting devices is selectively engageable to interconnect the first member of the second planetary gear set and the first member of the third planetary gear set with the stationary member.

5. The transmission of claim 4 wherein a fourth of the six torque transmitting devices is selectively engageable to interconnect the second member of the second planetary gear set and the first member of the first planetary gear set with the stationary member.

6. The transmission of claim 5 wherein a fifth of the six torque transmitting devices is selectively engageable to interconnect the third member of the second planetary gear set, second member of the first planetary gear set, and the first member of the fourth planetary gear set with the stationary member.

7. The transmission of claim 6 wherein a sixth of the six torque transmitting devices is selectively engageable to interconnect the second member of the fourth planetary gear set with the stationary member.

8. The transmission of claim 1 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, third member of the second planetary gear set, the third member of the third planetary gear set and the third member of the fourth planetary gear set are ring gears.

9. The transmission of claim 1 wherein the input member is continuously interconnected with the third member of the third planetary gear set and output member is continuously interconnected with the third member of the fourth planetary gear set.

10. The transmission of claim 1 wherein four of the six torque transmitting devices are brakes and two of the six torque transmitting devices are clutches.

11. The transmission of claim 1 wherein the stationary member is a transmission housing.

12. A transmission comprising:
    an input member;
    an output member;
    first, second, third and fourth planetary gear sets each having first, second and third members, wherein the input member is continuously interconnected with the third member of the third planetary gear set and output member is continuously interconnected with the third member of the fourth planetary gear set;
    a first interconnecting member continuously interconnecting the first member of the first planetary gear set with second member of the second planetary gear set;
    a second interconnecting member continuously interconnecting the second member of the first planetary gear set with the third member of the second planetary gear set and the first member of the fourth planetary gear set;
    a third interconnecting member continuously interconnecting the third member of the first planetary gear set with the second member of the third planetary gear set;
    a fourth interconnecting member continuously interconnecting the first member of the second planetary gear set with the first member of the third planetary gear set;

a first torque transmitting device selectively engageable to interconnect the input member and the third member of the third planetary gear set with the second member of the fourth planetary gear set;

a second torque transmitting device selectively engageable to interconnect the third member of the first planetary gear set and the second member of the third planetary gear set with the second member of the fourth planetary gear set;

a third torque transmitting device selectively engageable to interconnect the first member of the second planetary gear set and the first member of the third planetary gear set with the stationary member;

a fourth torque transmitting device selectively engageable to interconnect the second member of the second planetary gear set and the first member of the first planetary gear set with the stationary member;

a fifth torque transmitting device selectively engageable to interconnect the third member of the second planetary gear set, second member of the first planetary gear set, and the first member of the fourth planetary gear set with the stationary member; and a sixth torque transmitting device selectively engageable to interconnect the second member of the fourth planetary gear set with the stationary member, and wherein the torque transmitting devices are selectively engageable in combinations of at least two to establish at least eight forward speed ratios and at least one reverse speed ratio between the input member and the output member.

13. The transmission of claim 12 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, third member of the second planetary gear set, the third member of the third planetary gear set and the third member of the fourth planetary gear set are ring gears.

14. The transmission of claim 12 wherein the stationary member is a transmission housing.

15. A transmission comprising:
an input member;
an output member;
first, second, third and fourth planetary gear sets each having a sun gear, a carrier member and a ring gear, wherein the input member is continuously interconnected with the ring gear of the third planetary gear set and output member is continuously interconnected with the ring gear of the fourth planetary gear set;

a first interconnecting member continuously interconnecting the sun gear of the first planetary gear set with carrier member of the second planetary gear set;

a second interconnecting member continuously interconnecting the carrier member of the first planetary gear set with the ring gear of the second planetary gear set and the sun gear of the fourth planetary gear set;

a third interconnecting member continuously interconnecting the ring gear of the first planetary gear set with the carrier member of the third planetary gear set;

a fourth interconnecting member continuously interconnecting the sun gear of the second planetary gear set with the sun gear of the third planetary gear set;

a first torque transmitting device selectively engageable to interconnect the input member and the ring gear of the third planetary gear set with the carrier member of the fourth planetary gear set;

a second torque transmitting device selectively engageable to interconnect the ring gear of the first planetary gear set and the carrier member of the third planetary gear set with the carrier member of the fourth planetary gear set;

a third torque transmitting device selectively engageable to interconnect the sun gear of the second planetary gear set and the sun gear of the third planetary gear set with the stationary member;

a fourth torque transmitting device selectively engageable to interconnect the carrier member of the second planetary gear set and the sun gear member of the first planetary gear set with the stationary member;

a fifth torque transmitting device selectively engageable to interconnect the ring gear member of the second planetary gear set, carrier of the first planetary gear set, and the sun gear member of the fourth planetary gear set with the stationary member; and a sixth torque transmitting device selectively engageable to interconnect the carrier member of the fourth planetary gear set with the stationary member, and wherein the torque transmitting devices are selectively engageable in combinations of at least two to establish at least eight forward speed ratios and at least one reverse speed ratio between the input member and the output member.

16. The transmission of claim 15 wherein the stationary member is a transmission housing.

17. A transmission comprising:
an input member;
an output member;
first, second, third and fourth planetary gear sets each having first, second and third members;

a first interconnecting member continuously interconnecting the first member of the first planetary gear set with first member of the second planetary gear set;

a second interconnecting member continuously interconnecting the second member of the first planetary gear set with the second member of the third planetary gear set;

a third interconnecting member continuously interconnecting the third member of the first planetary gear set with the second member of the second planetary gear set and the second member of the fourth planetary gear set;

a fourth interconnecting member continuously interconnecting the third member of the second planetary gear set with the first member of the third planetary gear set; and six torque transmitting devices selectively engageable to interconnect one of the first, second, and third members with at least one other of the first members, second members, third members and a stationary member, and wherein the torque transmitting devices are selectively engageable in combinations of at least two to establish at least eight forward speed ratios and at least one reverse speed ratio between the input member and the output member.

18. The transmission of claim 17 wherein a first of the six torque transmitting devices is selectively engageable to interconnect the input member and the third member of the fourth planetary gear set with the second member of the first planetary gear.

19. The transmission of claim 18 wherein a second of the six torque transmitting devices is selectively engageable to interconnect the input member and the third member of the fourth planetary gear set with the first member of the first planetary gear set and the first member of the second planetary gear set.

20. The transmission of claim 19 wherein a third of the six torque transmitting devices is selectively engageable to interconnect the first member of the fourth planetary gear set with the stationary member.

21. The transmission of claim 20 wherein a fourth of the six torque transmitting devices is selectively engageable to interconnect the third member of the first planetary gear set, the second member of the second planetary gear set and the second member of the fourth planetary gear set with the stationary member.

22. The transmission of claim 21 wherein a fifth of the six torque transmitting devices is selectively engageable to interconnect the third member of the second planetary gear set and the first member of the third planetary gear set with the stationary member.

23. The transmission of claim 22 wherein a sixth of the six torque transmitting devices is selectively engageable to interconnect the second member of the first planetary gear set and the second member of the third planetary gear set with the stationary member.

24. The transmission of claim 17 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, third member of the second planetary gear set, the third member of the third planetary gear set and the third member of the fourth planetary gear set are ring gears.

25. The transmission of claim 17 wherein the input member is continuously interconnected with the third member of the fourth planetary gear set and output member is continuously interconnected with the third member of the third planetary gear set.

26. The transmission of claim 17 wherein four of the six torque transmitting devices are brakes and two of the six torque transmitting devices are clutches.

27. The transmission of claim 17 wherein the stationary member is a transmission housing.

28. A transmission comprising:
an input member;
an output member;
first, second, third and fourth planetary gear sets each having first, second and third members, wherein the input member is continuously interconnected with the third member of the fourth planetary gear set and output member is continuously interconnected with the third member of the third planetary gear set;
a first interconnecting member continuously interconnecting the first member of the first planetary gear set with first member of the second planetary gear set;
a second interconnecting member continuously interconnecting the second member of the first planetary gear set with the second member of the third planetary gear set;
a third interconnecting member continuously interconnecting the third member of the first planetary gear set with the second member of the second planetary gear set and the second member of the fourth planetary gear set;
a fourth interconnecting member continuously interconnecting the third member of the second planetary gear set with the first member of the third planetary gear set;

a first torque transmitting device selectively engageable to interconnect the input member and the third member of the fourth planetary gear set with the second member of the first planetary gear set;
a second torque transmitting device selectively engageable to interconnect the input member and the third member of the fourth planetary gear set with the first member of the first planetary gear set and the first member of the second planetary gear set;
a third torque transmitting device selectively engageable to interconnect the first member of the fourth planetary gear set with the stationary member;
a fourth torque transmitting device selectively engageable to interconnect the third member of the first planetary gear set, the second member of the second planetary gear set and the second member of the fourth planetary gear set with the stationary member;
a fifth torque transmitting device selectively engageable to interconnect the third member of the second planetary gear set and the first member of the third planetary gear set with the stationary member; and
a sixth torque transmitting device selectively engageable to interconnect the second member of the first planetary gear set and the second member of the third planetary gear set with the stationary member, and
wherein the torque transmitting devices are selectively engageable in combinations of at least two to establish at least eight forward speed ratios and at least one reverse speed ratio between the input member and the output member.

29. The transmission of claim 28 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, third member of the second planetary gear set, the third member of the third planetary gear set and the third member of the fourth planetary gear set are ring gears.

30. The transmission of claim 28 wherein the stationary member is a transmission housing.

31. A transmission comprising:
an input member;
an output member;
first, second, third and fourth planetary gear sets each having a sun gear, a carrier member and a ring gear, wherein the input member is continuously interconnected with the ring gear of the fourth planetary gear set and output member is continuously interconnected with the ring gear of the third planetary gear set;
a first interconnecting member continuously interconnecting the sun gear of the first planetary gear set with sun gear of the second planetary gear set;
a second interconnecting member continuously interconnecting the carrier member of the first planetary gear set with the carrier member of the third planetary gear set;
a third interconnecting member continuously interconnecting the ring gear of the first planetary gear set with the carrier member of the second planetary gear set and the carrier member of the fourth planetary gear set;
a fourth interconnecting member continuously interconnecting the ring gear of the second planetary gear set with the sun gear of the third planetary gear set;

a first torque transmitting device selectively engageable to interconnect the input member and the ring gear of the fourth planetary gear set with the carrier member of the first planetary gear set;

a second torque transmitting device selectively engageable to interconnect the input member and the ring gear of the fourth planetary gear set with the sun gear of the first planetary gear set and the sun gear of the second planetary gear set;

a third torque transmitting device selectively engageable to interconnect the sun gear of the fourth planetary gear set with the stationary member;

a fourth torque transmitting device selectively engageable to interconnect the ring gear of the first planetary gear set, the carrier member of the second planetary gear set and the carrier member of the fourth planetary gear set with the stationary member;

a fifth torque transmitting device selectively engageable to interconnect the ring gear of the second planetary gear set and the sun gear of the third planetary gear set with the stationary member; and a sixth torque transmitting device selectively engageable to interconnect the carrier member of the first planetary gear set and the carrier member of the third planetary gear set with the stationary member, and wherein the torque transmitting devices are selectively engageable in combinations of at least two to establish at least eight forward speed ratios and at least one reverse speed ratio between the input member and the output member.

32. The transmission of claim 31 wherein the stationary member is a transmission housing.

* * * * *